US006689333B1

(12) United States Patent
Stamires et al.

(10) Patent No.: US 6,689,333 B1
(45) Date of Patent: *Feb. 10, 2004

(54) PROCESS FOR THE PREPARATION OF QUASI-CRYSTALLINE BOEHMITES FROM INEXPENSIVE PRECURSORS

(75) Inventors: Dennis Stamires, Newport Beach, CA (US); Paul O'Connor, Hoevelaken (NL); Gregory Pearson, Seabrook, TX (US); William Jones, Cambridge (GB)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/636,692

(22) Filed: Aug. 11, 2000

Related U.S. Application Data

(63) Continuation-in-part of application No. 09/372,553, filed on Aug. 11, 1999, now abandoned.

(51) Int. Cl.⁷ .................................................. C01F 7/00
(52) U.S. Cl. ........................ 423/275; 423/625; 423/628
(58) Field of Search ............................ 423/625, 628, 423/275

(56) References Cited

U.S. PATENT DOCUMENTS

| | | | |
|---|---|---|---|
| 3,357,791 A | 12/1967 | Napier | 23/143 |
| 4,117,105 A | 9/1978 | Hertzenberg et al. | 423/625 |
| 4,248,852 A * | 2/1981 | Wakabayashi et al. | |
| 4,318,896 A * | 3/1982 | Schoonover | |
| 4,344,928 A * | 8/1982 | Dupin et al. | |
| 4,676,928 A * | 6/1987 | Leach et al. | |
| 4,738,946 A | 4/1988 | Yamashita et al. | 502/303 |
| 4,797,139 A | 1/1989 | Bauer | 51/293 |
| 5,194,243 A | 3/1993 | Pearson et al. | 423/625 |
| 5,718,879 A | 2/1998 | Chopin et al. | 423/628 |
| 5,837,634 A * | 11/1998 | McLaughlin et al. | |
| 6,027,706 A * | 2/2000 | Pinnavaia et al. | |
| 6,506,358 B1 * | 1/2003 | Stamires et al. | 423/625 |

FOREIGN PATENT DOCUMENTS

| | | |
|---|---|---|
| EP | 0 130 835 A2 | 1/1985 |
| EP | 0 597 738 A1 | 5/1994 |
| JP | 8-268716 | * 10/1996 |

OTHER PUBLICATIONS

J. Medena, J. Catalysis, vol. 37 (1975), 91–100, no month.
J. Wachowski, et al., Materials Chemistry, vol. 37 (1994), 29–38, no month.
G. Yamaguchi, et al., Bull. Chem. Soc. Jap., vol. 32 (1959), 696–699, no month.
G. Yamaguchi, et al., J. Chem. Soc. Jap., (Ind. Chem. Soc.), (1963), English Translation, 21 pages, no month.
Abstract of Japanese Patent No.: JP 08268716; 10/96.
International Search Report Dated: Dec. 28, 2000.

* cited by examiner

Primary Examiner—Steven Bos
(74) Attorney, Agent, or Firm—Louis A. Morris

(57) ABSTRACT

The present invention pertains to cheaper process for the preparation of quasi-crystalline boehmite containing additive in a homogeneously dispersed state. In this cheaper process an inexpensive quasi-crystalline boehmite precursor is and additive are combined and aged to form a quasi-crystalline boehmite containing additive in a homogeneously dispersed state. Suitable inexpensive quasi-crystalline boehmite precursors are aluminum trihydrate and thermally treated forms thereof and inorganic aluminum salts. Suitable additives are compounds containing elements selected from the group of rare earth metals alkaline earth metals, transition metals, actinides, silicon, gallium, boron, and phosphorus.

12 Claims, No Drawings

US 6,689,333 B1

PROCESS FOR THE PREPARATION OF QUASI-CRYSTALLINE BOEHMITES FROM INEXPENSIVE PRECURSORS

CROSS REFERENCE TO RELATED APPLICATION

This application is a continuation-in-part of U.S. application Ser. No. 09/372,553, filed Aug. 11, 1999, now abandoned.

BACKGROUND OF THE INVENTION

1. Field of the Invention

The present invention pertains to a process for the preparation of quasi-crystalline boehmites containing additives.

2. Description of the Prior Art

Alumina, alpha-monohydrates or boehmites and their dehydrated and or sintered forms are some of the most extensively used aluminum oxide-hydroxides materials. Some of the major commercial applications involve one or more forms of these materials and these are, for example, ceramics, abrasive materials, fire-retardants, adsorbents, catalysts fillers in composites and so on. Also,a major portion of the commercial boehmite aluminas is used in catalytic applications such as refinery catalysts for hydrotreating, catalyst for hydroprocessing hydrocarbon feeds, reforming catalysts, pollution control catalysts, cracking catalysts. The term "hydroprocessing" in this context encompasses all processes in which a hydrocarbon feed is reacted with hydrogen at elevated temperature and elevated pressure. These processes include hydrodesulphurisation, hydrodenitrogenation, hydrodemetallisation, hydrodearomatisation, hydro-isomerisation, hydrodewaxing, hydrocracking, and hydrocracking under mild pressure conditions, which is commonly referred to as mild hydrocracking. This type of aluminas is also used as catalysts for specific chemical processes such as ethylene-oxide production, and methanol synthesis. Relatively newer commercial uses of boehmite type of aluminas or modified forms thereof involve the transformation of environmentally unfriendly chemical components such as chlorofluorohydrocarbons (CFC's) and other undesirable pollutants. Boehmite alumina types are further used as catalytic material in the combustion of gas turbines for reducing nitrogen oxide.

The main reason for the successful extensive and diversified use of these materials in such variety of commercial uses, is their ability and flexibility to be "tailor" made to products with a very wide range of physical-chemical and mechanical properties.

Some of the main properties which determine the suitability of commercial applications involving gas-solid phase interactions such as catalysts and adsorbents are pore volume, pore size distribution, pore texture, specific density, surface areas, density and type of active centers, basicity and acidity, crushing strength, abrasion properties, thermal and hydrothermal aging (sintering) and long term stability.

To a large extent, the desired properties of the alumina product can be obtained by selecting and carefully controlling certain parameters which usually involve: raw materials, impurities, precipitation or conversion process conditions, aging conditions and subsequent thermal treatments (calcinations/steamings) and mechanical treatments.

Nevertheless, in spite of all this large and diversified existing know-how, this technology still develops and presents unlimited scientific and technological challenges both to the manufacturers and end-users for further developments of such alumina based materials.

The term, boehmite, is used in the industry to describe alumina hydrates which exhibit XRD patterns close to that of the aluminum oxide-hydroxide [AlO(OH)], naturally occurring boehmite or diaspore. Further, the general term, boehmite, usually is used to broadly describe a wide range of alumina hydrates which contain different amounts of water of hydration, have different surface areas, pore volumes, specific densities, and exhibit different thermal characteristics upon thermal treatments. Yet their XRD patterns, although exhibit the characteristic boehmite [AlO(OH)] peaks, usually vary in their widths and can also shift in their location. The sharpness of the XRD peaks and their location have been used to indicate degree of crystallinity, crystal size, and amount of imperfections.

Broadly, there are two categories of boehmite aluminas. Category I, in general, contains boehmites which have been synthesized and/or aged at temperatures close to 100° C. and most of the time under ambient atmospheric pressures. In the present specification, this type of boehmite is referred to as quasi-crystalline boehmites. The second category of boehmite consists of so-called microcrystalline boehmites.

In the state of the art, category I boehmites, quasi-crystalline boehmites, are referred to, interchangeably as: pseudo-boehmites, gelatinous boehmites or quasi-crystalline boehmites (QCB). Usually these QCB aluminas have very high surface areas, large pores and pore volumes, lower specific densities than microcrystalline boehmites, disper easily in water of acids, they have smaller crystal sizes than microcrystalline boehmites, and contain a larger number of water molecules of hydration. The extent of hydration of the QCB can have a wide range of values, for example from about 1.4 up and about 2 moles of water per mole of AlO, intercalculated usually orderly or otherwise between the octahedral layers.

The DTG (differential thermographimetry) curves the water release from the QCB materials as function of temperature show that the major peak appears at much lower temperatures as compared to that of the much more crystalline boehmites.

The XRD Patterns of QCBs show quite broad peaks and their half-widths are indicative of the crystal sizes as well as degree of crystal perfection.

The broadening of the widths at half-maximum intensities varies substantially and typical for the QCB's could be from about 2°–6° to 2θ. Further, as the amount of water intercalated into the QCB crystals is increased, the main (020) XRD reflection moves to lower 2θ values corresponding to greater d-spacings. Some typical, commercially available QCB's are; Condea Pural®, Catapal® and Versal® products.

The category II of the boehmites consists of microcrystalline boehmites (MCB), which are distinguished from the QCBs due to their high degree of crystallinity, relatively large crystal sizes, very low surface areas, and high densities. Contrary to the QCB's the MCB's show XRD patterns with higher peak intensities and very narrow half-peak line widths. This is due to the relatively small number of water molecules intercalated, large crystal sizes, higher degree of crystallization of the bulk material and to lesser amount of crystal imperfections present. Typically, the number of molecules of water intercalated can vary in the range from about 1 up to about 1.4 per mole of AlO. The main XRD reflection peaks (020) at half-length of maximum intensities have widths from about 1.5 down to about 0.1 degrees 2-theta (2θ). For the purpose of this specification we define quasi-crystalline boehmites to have 020 peak widths at half-length of the maximum intensity of 1.5 or greater than 1.5°. Boehmites having a 020 peak width at half-length of the maximum intensity smaller than 1.5 are considered microcrystalline boehmites.

A typical MCB commercially available product is Condea's P-200® grade of alumina. Overall, the basic, characteristic differences between the QCB and MCB types of boehmites involve variations in the following: 3-dimensional lattice order, sizes of the crystallites, amount of water intercalated between the octahedral layers and degree of crystal imperfections.

Regarding the commercial preparation of these boehmite aluminas, QCB's are most commonly manufactured via processes involving:

Neutralization of aluminum salts by alkalines, acidification of aluminate salts, hydrolysis of aluminum alkoxides, reaction of aluminum metal (amalgamated) with water and rehydration of amorphous rho-alumina obtained by calcining gibbsite. The MCB type of boehmite aluminas, in general are commercially produced with hydrothermal processes using temperatures usually above 150° C. and autogeneous pressures. These processes usually involve hydrolysis of aluminum salts to form gelatinous aluminas, which are subsequently hydrothermally aged in an autoclave at elevated temperatures and pressures. This type of process is described in U.S. Pat. No. 3,357,791. Several variations of this basic process exist involving different starting aluminum sources, additions of acids or salts during the aging, and a wide range of process conditions.

MCB's are also prepared using hydrothermal processing of gibbsite. Variations of these processes involve; addition of acids, alkaline and salts during the hydrothermal treatment, as well as the use of boehmite seeds to enhance the conversion of gibbsite to MCB. These types of processes are described in Alcoa's U.S. Pat. No. 5,194,243, in U.S. Pat. No. 4,117,105 and in U.S. Pat. No. 4,797,139.

Nevertheless, whether pseudo-, quasi- or microcrystalline such boehmite materials are characterized by reflections in their powder X-ray. The ICDD contains entries for boehmite and confirms that reflections corresponding to the (020), (021) and (041) planes would be present. For copper radiation, such reflections would appear at 14, 28 and 38 degrees two theta. The various forms of boehmite would be distinguished by the relative intensity and width of the reflections. Various authors have considered the exact position of the reflections in terms of the extent of crystallinity. Nevertheless, lines close to the above positions would be indicative of the presence of one or more types of boehmite phases.

In the prior art, we find QCB containing metal ions which have been prepared by the hydrolysis of alumina isopropoxide with the co-precipitation of lanthanides as described in the paper by J. Medena, J. Catalysis, vol. 37, 91-(1975), and J. Wachowski et al., Materials Chemistry, vol. 37, 29–38 (1994). This process is conducted at a pH above 7.0. The products are pseudo-boehmite type aluminas with the occlusion of one or more lanthanide metal ions. These materials have been primarily used in high temperature commercial applications where the presence of such lanthanide metal ions in the pseudo-boehmite structure retards the transformation of the gamma-alumina to the alpha-alumina phase. Therefore, a stabilization of the gamma phase is obtained, retaining a higher surface area before it converts to the refractory lower surface area alpha-alumina. Specifically Wachowski et al. used the lanthanide ions (La, Ce, Pr, Nd, Sm) in quantities from 1% to 10% by weight which were calcined at temperatures in the range of 500° C. to 1200° C.

Also, EP-A1-0 597 738 describes the thermal stabilization of alumina by addition of lanthanum, optionally combined with neodymium. This material is prepared by aging rehydrateble alumina (i.e. flash calcined gibbsite) in a slurry at a pH between 8 and 12 with a lanthanum salt at a temperature between 70 and 110° C., followed with thermal treatment at a temperature between 100 and 1000° C.

Further, EP-A-0 130 835 describes a catalyst comprising a catalytically active metal supported on a lanthanum or neodymium-$\beta$-$Al_2O_3$ carrier. Said carrier is obtained by precipitation of aluminum nitrate solution with ammonium hydroxide in the presence of a lanthanum, praseodymium or neodymium salt solution. As the precipitated amorphous material is directly washed with water and filtered, the alumina is not allowed under the usual conditions and certain pH, concentration and temperatures to age with time so that it crystallizes to a boehmite alumina structure.

SUMMARY OF THE INVENTION

The primary embodiment of the present invention is directed to a cheaper process for the preparation of quasi-crystalline boehmite containing additive in a homogeneously dispersed state. In this cheaper process an inexpensive quasi-crystalline boehmite precursor is aged in the presence of an additive to form a quasi-crystalline boehmite containing additive in a homogeneously dispersed state.

Other objectives and embodiments of our invention encompass details about compositions, manufacturing steps, etc., all of which are hereinafter disclosed in the following discussion of each of the facets of the present invention.

DETAILED DESCRIPTION OF THE INVENTION

In the prior art quasi-crystalline boehmites containing lanthanides in a homogeneously dispersed state are described. These QCBs however, are prepared from aluminium alkoxides or from flash calcined gibbsite. These quasi-crystalline boehmite precursors are expensive alumina compounds which can only be obtained from complicated (and thus) expensive processes.

It was found that when using inexpensive alumina sources as quasi-crystalline boehmite precursors in combination with additives, QCBs are obtained with comparable quality and homogeneous additive dispersion as QCBs prepared from aluminium alkoxides or flash calcined gibbsite. Suitable quasi-crystalline boehmite precursors are soluble aluminium salts such as aluminum sulfate, aluminum nitrate, aluminum chloride and sodium aluminate, gel alumina, thermally treated aluminium trihydrate, aluminum trihydrate such as gibbsite and bayerite and mixtures thereof. Even very crude grades of aluminium trihydrate such as BOC and bauxite can be used in this process.

Flash calcined gibbsite is not considered a thermally treated aluminum trihydrate here, because it is a product of calcination of gibbsite in at high temperatures in special equipment, as is described in U.S. Pat. Nos. 4,051,072 and 3,222,129, which results in a material with totally different properties form conventionally calcined gibbsite. Calcined aluminum trihydrate is readily obtained by thermally treating aluminum trihydrate at a temperature ranging from 100 to 800° C. from 15 minutes to 24 hours.

Additives present in QCB aid to adjust the QCBs physical, chemical and catalytic properties such as thermal stability, specific density, surface area, pore volume, pore size distribution, density and type of active centers, basicity and acidity, crushing strength, abrasion properties etcetera, and so determine the boehmite's suitability for use in catalytical or absorbent material. It is, of course, possible to incorporate different types of additives in the QCB according to the invention.

Suitable additives are compounds containing elements selected from the group of rare earth metals, alkaline earth metals, alkaline metals, transition metals, actinides, silicon, gallium, boron, titanium and phosphorus. For instance, the presence of silicon increases the amount of acidic sites in the boehmite, transition metals introduce catalytic or absorbing activity such as $SO_x$ captivation, $NO_x$ captivation, hydrogenation, hydroconversion, and other catalytic systems for gas/solid interactions.

Suitable compounds containing the desired elements are nitrates, sulfates, chlorides, formates, acetates, carbonates, vanadates etctera. The use of compounds with decomposable anions is preferred, because the resulting QCBs with additive may directly be dried, without any washing, as undesirable anions for catalytic purposes are not present.

Said QCBs according to the invention may be prepared in several ways. In general a quasi-crystalline boehmite precursor and additive are aged to form a quasi-crystalline boehmite containing additive in a homogeneously dispersed state. Aging is considered a thermal treatment in the presence of a protic liquid or gas such as water, ethanol, propanol or steam. The aging may also be conducted hydrothermally, i.e. with increased pressure such as aging in water at a temperature above 100° C. under autogeneous pressure. Examples of suitable preparation processes are described below:

Process 1

The QCB may be prepared by hydrolysis and precipitation as hydroxides of soluble inorganic aluminim salts and aged to form a QCB. Examples of suitable aluminum salts are aluminum sulfate, aluminum nitrate, aluminum chloride, sodium aluminate, and mixtures thereof. The additive(s) may be added simultaneously during hydrolysis and coprecipitation or at the end in the aging step.

Process 2

The QCB can also be prepared by aging a slurry containing a thermally treated form of aluminium trihydrate and additive for a time sufficient to form QCB. If the aging is done thermally, the aging temperature ranges from 80 to 130° C., preferably from 90 and 110° C. This preparation method has the advantage that no ions are introduced into the QCB beside optionally any ions of the additive compound. That means that with the appropriate choice of additive compounds washing steps can be reduced or avoided altogether. For instance, when additive compounds are used with decomposable anions (such as carbonates, nitrates and formates) are used, the QCB containing additive may be dried directly, as undesirable anions for catalytical purposes are not present. A further advantage of this preparation method is that it is possible to first shape a slurry containing a thermally treated form of aluminum trihydrate and optionally additive, reslurry the shaped bodies, and subsequently age the shaped bodies to form QCB. Shaping is defined in this specification as any method of obtaining particles with the appropriate size and strength for the specific purpose. Suitable shaping methods are spray-drying, extrusion, pelletizing, beading or any other conventional shaping method used in the catalyst field.

Process 3

QCBs may also be prepared by aging by hydrothermal treatment alumina trihydrates such as gibbsite, BOC, bauxite and bayerite, with the help of suitable boehmite seeds in the presence of compounds of the desired additives. Suitable seeds are the known seeds to make microcrystalline boehmite such as commercially available boehmite (Catapal®, Condea® Versal, P-200® etcetera), amorphous seeds, milled boehmite seeds, boehmite prepared from sodium aluminate solutions, etcetera. Also quasi-crystalline boehmites prepared by one of the processes described here can suitably be used as a seed. It was found that aging at a pH below 7 favors the production of QCBs over MCBs. Like in process 2, no additional ions beside optionally any ions of the additive are introduced into the QCB, and this process allows shaping prior to the aging step.

Although, process 3 described-above is known for the preparation of microcrystalline boehmites, we found that the process can be adapted to favor the production of QCBs over MCBs. The process can be adapted to form QCBs by adjusting the seed, the pH and the hydrothermal conditions used.

The first publications on the use of seeds in the hydrothermal conversion of aluminum trihydrate date back in the late 1940's/early 1950's. For example, G. Yamaguchi and K. Sakamato (1959), cleary demonstrate the concept that boehmite seeds substantially improved the kinetics of the hydrothermal conversion of gibbsite to boehmite, by lowering the temperature, shorten the reaction time, and increase the gibbsite conversion.

Also the beneficial principle of seeding with boehmite in the hydrothermal transformation of gibbsite in an autoclave operating at elevated temperatures and autogeneous pressures was also demonstrated clearly by G. Yamaguchi and H. Yamanida (1963).

There are several other publications in the open literature, in which equally well the benefits of seeding with boehmite and/or alkaline solutions are demonstrated. Further, the use of boehmite seed is also claimed to produce finer particle size boehmite product which is easier to disperse in water. The use of boehmite seeds in the hydtrothermal conversion of gibbsite has been described in U.S. Pat. No. 4,797,139, filed on Dec. 16, 1987 and in U.S. Pat. No. 5,194,243, filed on Sep. 30, 1985.

Process 4

This process involves the further development of crystallinity of low crystallinity starting boehmite in the presence of additives. For example, the gel-pseudo boehmite which has low crystallinity as prepared according to the teachings of U.S. Pat. No. 4,313,923 is further aged at higher temperatures then previously-exposed in the presence of solutions containing additive salts. This post aging which can be conducted at temperatures between room temperature and 100° C. or at temperatures above 100° C. with pH adjustments results in quasi-crystalline boehmites with higher crystallinity.

Process 5

Another method of introducing additives into boehmites is via the use of additive containing seeds. For example, quasi-crystalline boehmite prepared in the presence of additives according to any of the above-described processes is used as a seed in a slurry containing gibbsite and optionally additives. The gibbsite is hydrothermally converted into additive-containing QCB. The additive used in the seed may be the same or different from the additive used in the slurry.

In all the above-described processes an intermediate calcination step, prior to the aging step may be applied.

All the processes described above may be conducted batch-wise or in a continuous mode, optionally in a continuous multi step operation. The processes may be conducted partly continuous, partly batchwise.

As mentioned-above, more than one type of QCB precursor may be used, although care must be taken that the reaction conditions employed enable the conversion of the precursor to QCB. Said mixture of QCB precursors may be prepared before introduction of the additive or the various types of precursors may be added in any of the further stages of the reaction.

In the processes for the preparation of the QCBs according to the invention more than one aging step may be applied, wherein for instance the aging temperature and/or condition (thermally or hydrothermally, pH, time) is varied.

The reaction products of the processes for the preparation of the QCBs according to the invention may also be recycled to the reactor.

If more than one type of additive is incorporated into the QCB, the various additives may be added simultaneously or sequentially in any of the reaction steps.

It may be advantageous to add acids or bases to adjust the pH during the hydrolysis and/or precipitation.

As mentioned-above some of the processes for the preparation of the quasi-crystalline boehmites according to the invention allow shaping into shaped bodies during preparation. It is also possible to shape the final QCB, optionally with the help of binders and/or fillers. The invention is also directed to a process for the preparation of shaped bodies containing QCB prepared with the process according to the invention.

As mentioned above, the QCBs according to the invention are extremely suitable as components or starting material for catalyst compositions or catalyst additives. To this end the QCB is combined with, optionally, binders, fillers (e.g. clay such as kaolin, titanium oxide, zirconia, silica, silica-alumina, bentonite etcetera), catalytically active material such as molecular sieves (e.g. ZSM-5, zeolite Y, USY zeolite), and any other catalyst components such as for instance pore regulating additives, which are commonly used in catalyst compositions. For some applications it may be advantageous to neutralize the QCB before use as catalyst component, for instance to improve or create pore volume. Further, it is preferred to remove any sodium to a content below 0.1 wt % $Na_2O$.

In a further embodiment of the invention, the QCB may be mixed with other metal oxides or hydroxides, binders, extenders, activators, pore regulating additives, etcetera in the course of further processing to produce absorbents, ceramics, refractories, substrates, and other carriers.

For catalytic purposes, boehmites are generally used at temperatures between 200 and 1000° C. At these high temperatures the boehmites are usually converted into transition-aluminas. Therefore, the present invention is also directed to transition alumina which is obtainable by thermal treatment of the quasi-crystalline boehmite prepared with the process according to the invention With the above-mentioned transition aluminas catalyst compositions or catalyst additives can be made, optionally with the help of binder materials, fillers, etcetera.

The present invention will be illustrated by means of the following non-limiting examples.

EXAMPLES

Example 1

A slurry containing finely ground BOC and 10% Catapal A alumina® strongly peptized with nitric acid, as a seed was prepared. The pH was adjusted to 6 and 10 wt % lanthanum nitrate (calculated as oxide) in solution was added. The resulting slurry was homogenized in a blender and transferred to an autoclave where it was heated under autogeneous pressure to 175° C. for 2 hours.

Example 2

Example 1 was repeated using fine particle Gibbsite and sodium aluminate (10 wt % calculated as alumina) as a seed. The pH was adjusted between 6 and 7 with nitric acid, and 5 wt % lanthanum nitrate (calculated as oxide) in solution was added. The resulting slurry was homogenized in a blender and transferred to an autoclave where it was heated under autogeneous pressure to 165° C. for 2 hours.

Example 3

Fine ground BOC was slurried in water with shear homogenizing mixing. To this slurry 20 wt % gel-pseudo boehmite alumina which was prepared according to the procedure described in U.S. Pat. No. 4,313,923 was added as seed with further mixing. Ammonium hydroxide was added to bring the pH to about 10 and then the slurry was aged at 170° C. for 2 hours, then filtered and washed. The product was analyzed with XRD which indicated that it was a quasi-crystalline boehmite, similar to commercially available Condea P3®.

Example 4

Example 3 was repeated, except that the pH of the slurry containing the BOC and the seed was adjusted to a pH close to 5. The aging conditions were the same as for example 3. The product was analyzed with XRD which indicated that it was a quasi-crystalline boehmite, similar to commercially available Condea P3®.

Example 5

The product of example 3 was slurried in a water solution containing 10 wt % zinc nitrate with high shearing. The slurry was subsequently heated to 160° C. under autogeneous pressure and aged for 1 hour. The product was filtered and washed and analyzed by XRD which indicated the product to be a quasi-crystalline boehmite.

Example 6

The product of example 4 was slurried in a water solution containing 8 wt % copper nitrate with high shearing. The slurry was subsequently heated to 150° C. under autogeneous pressure and aged for 1 hour. The product was filtered and washed and analyzed by XRD which indicated the product to be a quasi-crystalline boehmite.

Example 7

The product of example 3 was slurried in water with high shearing. To the slurry a solution of 6 wt % nickel nitrate was added with further mixing. The final slurry was subsequently heated to 160° C. under autogeneous pressure and aged for 1 hour. The product was filtered and washed and analyzed by XRD which indicated the product to be a quasi-crystalline boehmite Example 8

Example 3 was repeated, except that to the slurry containing the BOC and the seed, 5 wt % zinc nitrate solution was added. Then the slurry was further homogenized and aged in an autoclave at 170° C. for 2 hours under autogeneous pressure. The product was filtered and washed and analyzed with XRD which indicated that it was a quasi-crystalline boehmite.

Example 9

The product of example 8 was slurried in a water solution containing 6 wt % lanthanum nitrate. The slurry was homogenized with shear mixing and subsequently aged at 160° C. for 1 hour.

Example 10

A metal doped boehmite seed was prepared by using the precipitation procedure of U.S. Pat. No. 4,313,923 to precipitate sodium aluminate and aluminium sulfate with the occlusion of 5 wt % zinc nitrate by aging for 18 hours at 75° C. The product was washed filtered, dried and XRD analysis indicated the presence of a gel pseudoboehmite. This was slurried in water together with gibbsite in proportions of 20 wt % and 80 wt % respectively. The pH was adjusted to close to 9 and the final slurry was aged at 170° C. for two hours. The product was washed, filtered and dried. XRD analysis indicated the presence of quasi-crystalline boehmite.

Example 11

Example 10 was repeated except that in the slurry before aging 8 wt % lanthanum nitrate in solution was added and homogenized with shear mixing. The slurry was subsequently aged at 160° C. for two hours in an autoclave. The XRD of the washed product indicated the presence of quasi-crystalline boehmite.

Example 12

A slurry of Chattem® alumina and 5 wt % lanthanum nitrate (calculated as the oxide) with pH adjusted to 10 with $NH_4OH$. The slurry was mixed and dried at 120° C. without aging.

Example 13

A slurry of Chattem® alumina and 5 wt % lanthanum nitrate (calculated as the oxide) with pH adjusted to 4 with $HNO_3$. The slurry was mixed and dried at 120° C. without aging.

Example 14

A slurry of Chattem® alumina and 5 wt % lanthanum nitrate (calculated as the oxide) with pH adjusted to 4 with $HNO_3$. The slurry was mixed and dried at 100° C. without aging.

Example 15

A slurry with pH adjusted to 4 containing gibbsite and calcined gibbsite, which was heated at 600° C. for 2 hours (70:30 wt %) and 5 wt % lanthanum nitrate (calculated as the oxide) was heated at 198° C. for 60 minutes and the product was dried at 110° C.

Example 16

A sample was made of a slurry of Catapal® and 10 wt % lanthanum nitrate (calculated as the oxide) adjusted to a pH of 11 with NaOH. The slurry was heated at 198° C. for 1 hour and the product was dried at 100° C.

What is claimed is:

1. A process for the preparation of quasi-crystalline boehmite wherein a quasi-crystalline boehmite precursor and an additive are combined and aged to form a quasi-crystalline boehmite in which an additive is homogeneously dispersed, the quasi-crystalline boehmite precursor being selected from the group consisting of aluminum trihydrate, a thermally treated form of aluminum trihydrate not being flash calcined gibbsite, and mixtures thereof, said quasi-crystalline boehmite having XRD reflection (020) peak widths at half-length of the maximum intensity of 1.5 or greater than 1.5 degrees 2-theta.

2. The process of claim 1 wherein the quasi-crystalline boehmite precursor is aged under hydrothermal conditions.

3. The process of claim 2 wherein the additive is a compound containing an element selected from the group consisting of rare earth metals, alkaline earth metals, transition metals, actinides, silicon, boron, and phosphorus.

4. The process of claim 3 wherein more than one quasi-crystalline boehmite precursor is aged.

5. The process of claim 1 wherein said precursor comprises thermally treated aluminum trihydrate and is rehydrated in water to form a slurry.

6. The process of claim 1 wherein said precursor comprises aluminum trihydrate and aging is effected in the presence of a boehmite seed.

7. The process of claim 5 wherein the quasi-crystalline boehmite precursor is shaped into a shaped body prior to the aging step.

8. The process of claim 6 wherein the quasi-crystalline boehmite precursor is shaped into a shaped body prior to the aging step.

9. The process of claim 1 which is conducted in a continuous mode.

10. The process of claim 1 wherein said preparation is carried out in a reactor and the formed quasi-crystalline boehmite containing an additive in a homogeneously dispersed state is recycled to said reactor.

11. The process of claim 1 wherein aging is conducted in more than one step.

12. The process of claim 1 wherein the quasi-crystalline boehmite formed in the aging step is shaped into a shaped body.

* * * * *